US009465935B2

(12) United States Patent
Cepuran et al.

(10) Patent No.: US 9,465,935 B2
(45) Date of Patent: Oct. 11, 2016

(54) SYSTEMS, METHODS, AND APPARATUS FOR SECURING USER DOCUMENTS

(75) Inventors: Brian John Cepuran, Oakville (CA); Daryl McMillan, Waterloo (CA); David Lockhart, Waterloo (CA); Dariusz Grabka, Kitchener (CA)

(73) Assignee: D2L Corporation, Kitchener, Ontario (CA)

(*) Notice: Subject to any disclaimer, the term of this patent is extended or adjusted under 35 U.S.C. 154(b) by 0 days.

(21) Appl. No.: 13/156,045

(22) Filed: Jun. 8, 2011

(65) Prior Publication Data

US 2011/0307960 A1 Dec. 15, 2011

Related U.S. Application Data

(60) Provisional application No. 61/354,015, filed on Jun. 11, 2010.

(51) Int. Cl.
*H04L 29/06* (2006.01)
*G06F 21/51* (2013.01)

(52) U.S. Cl.
CPC ........ *G06F 21/51* (2013.01); *G06F 2221/2119* (2013.01)

(58) Field of Classification Search
CPC ........ G06F 21/10; G06F 21/23; G06F 21/51; G06F 8/75; G06F 2221/2119; G06Q 50/22; G06Q 10/10; G11B 20/00086; G11B 20/0021
USPC .......................................................... 726/26
See application file for complete search history.

(56) References Cited

U.S. PATENT DOCUMENTS

| | | | |
|---|---|---|---|
| 5,297,249 A | 3/1994 | Bernstein et al. | |
| 6,587,668 B1 | 7/2003 | Miller et al. | |
| 7,814,143 B2* | 10/2010 | Brown et al. | 709/203 |
| 2005/0019740 A1 | 1/2005 | Cunningham et al. | |
| 2006/0184632 A1* | 8/2006 | Marino et al. | 709/206 |
| 2007/0136806 A1* | 6/2007 | Berman | 726/22 |
| 2008/0021767 A1* | 1/2008 | Benson et al. | 705/10 |
| 2008/0104679 A1* | 5/2008 | Craig | 726/4 |
| 2008/0263670 A1* | 10/2008 | Stavrica | 726/24 |
| 2008/0282338 A1* | 11/2008 | Beer | 726/12 |
| 2010/0035639 A1* | 2/2010 | Gupta et al. | 455/466 |
| 2010/0042931 A1* | 2/2010 | Dixon et al. | 715/738 |

\* cited by examiner

*Primary Examiner* — Carl Colin
*Assistant Examiner* — Ghodrat Jamshidi
(74) *Attorney, Agent, or Firm* — Bereskin & Parr LLP

(57) ABSTRACT

The invention is directed to systems, methods and apparatus for securing documents. The system comprises a server having a processor and a data storage device for storing documents, at least one document provider connected to the server, the at least one document provider operable to provide user documents to the server for storage in the data storage device, the user documents containing at least one object of security concern, and at least one document consumer connected to the server, the at least one document consumer operable to receive the user documents containing the at least one object of security concern from the server. The processor in the server is operable to determine whether to provide the at least one object of security concern to the at least one document consumer based on at least one security setting, and based on the decision either provide the documents with the at least one object of security concern or provide a replacement documents without the security of concern and an indication on each replacement document that that the at least one object of security concern has been excluded.

24 Claims, 10 Drawing Sheets

| OBJECT TYPE | SCOPE | ACTION |
|---|---|---|
| LINK | ALL DOCUMENTS FROM WWW.WHITELINK.COM | ALLOW |
| LINK | ALL DOCUMENTS FROM USER ROLE = INSTRUCTOR | ALLOW |
| JAVASCRIPT | FROM USER NAME = JOHN DOE | BLOCK |
| JAVASCRIPT | FROM USER NAME = M. SMITH | ALLOW |
| IFRAME | FROM WWW.BLACKLINK.COM | BLOCK |
| TOOL | ALL QUIZ QUESTIONS IN CLASS PHIL223 | ALLOW |
| TOOL | ALL RESPONSES SUBMITTED TO QUIZZES IN CLASS PHIL223 | BLOCK |

SYSTEMS, METHODS, AND APPARATUS FOR SECURING USER DOCUMENTS

RELATED APPLICATIONS

This application claims the benefit of U.S. Provisional Patent Application Ser. No. 61/354,015 filed Jun. 11, 2010 and entitled "SYSTEMS, METHODS, AND APPARATUS FOR SECURING USER DOCUMENTS", the entire contents of which are hereby incorporated by reference herein for all purposes.

FIELD

The embodiments described herein are directed to securing documents and in particular to securing documents over a computer network.

INTRODUCTION

The Internet provides a forum for sharing information. Generally, a user obtains information from the Internet using a software application known as a "web browser". The web browser application is operable to receive instructions in web documents and execute the instructions to present information embedded therein to the user. The instructions in the web documents are typically provided in Hyper Text Mark-up Language (HTML) and other associated languages.

A person who wishes to share information with other individuals may do so by uploading a document to a server. The uploaded document will be then available on the server for download and viewing by interested persons with appropriate levels of access. However, the uploaded document may contain inappropriate content and/or instructions that may produce undesirable results when executed by the web browser application.

To reduce the risk of documents causing undesirable results when they are executed, the web browser applications may prohibit execution of instructions of certain type. For examples, the web browser application may not execute JavaScripts unless expressly requested by the user. However, categorically refusing to execute particular types of instructions may deprive the user of beneficial integrations from files of that type.

In some environments, an application on the user's computer, for example a plug-in application to the web browser application, may block web pages from websites that are deemed to be not trustworthy. For example, there are various commercial software applications available that restrict web browsers from accessing inappropriate material from unauthorized persons (e.g., children). Generally, these applications provide different levels of access to different users. For example, parents using the application (upon password verification) may use the web browser to access any web site. Children (or those without password verification) may only receive web pages from websites deemed by the application to be trustworthy. As such, a user of the software application may be limited to either use the filters provided by the application, or not use any filters at all. Specifically, the user may not have the option to customize filtering preferences.

Additionally, this type of software application is normally limited to the specific computer that the software is installed on. With the advance of mobile technology, a user may access the Internet using a multitude of devices such as desktops, laptops, smart phones, netbooks, and tablet computers.

Accordingly, the inventors have identified a need for improved systems, methods, and apparatus for securing documents that attempt to address at least some of these concerns.

SUMMARY

According to one embodiment, there is provided a system for securing documents. The system comprises a server having at least one processor and at least one data storage device for storing documents, at least one document provider connected to the server, the at least one document provider operable to provide at least one user document to the server for storage in the at least one data storage device, the at least one user document containing at least one object of security concern, and at least one document consumer connected to the server, the at least one document consumer operable to receive the at least one user document containing the at least one object of security concern from the server. The at least one processor in the server is operable to determine whether to provide the at least one object of security concern to the at least one document consumer based on at least one security setting. If it is determined that the at least one object of security concern should be provided, the at least one processor in the server is operable to provide the at least one user document with the at least one object of security concern to the at least one document consumer. If it is determined that the at least one object of security concern should not be provided, then the at least one processor in the server is operable to generate at least one replacement document containing the at least one user document without the at least one object of security concern and including an indication that the at least one object of security concern has been excluded, and to provide the at least one replacement document to the at least one document consumer.

The at least one security setting may include at least one centralized list managed by the server. The at least one centralized list may comprise a black list indicative of a list of objects of security concern that should not be provided to the at least one document consumer. The at least one centralized list may comprise a white list indicative of a list of objects of security concern that should be provided to the at least one document consumer. The at least one centralized list may be applicable to all user documents provided by the at least one document provider.

In some embodiments, the at least one processor in the server is further operable to provide a screening document containing information about the at least one object of security concern such that at least one user of the at least one document consumer is able to use that information to assess security risk associated with the object of security concern, and at least one option for the at least one user to provide preference information to the server indicative of whether to provide the object of security concern to the at least one document consumer.

The at least one data storage device in the server may have at least one user profile associated with the at least one user and the at least one processor may be further operable to: associate the preference information provided by the at least one user to the server indicative of whether to provide the at least one object of security concern with the at least one user profile; and store the preference information in the at least one data storage device.

The at least one security setting may comprise at least one centralized list, and the at least one processor may be further operable to: modify the at least one centralized list for the at least one user based on the preference information provided by the at least one user in response to the screening document; associate the modified centralized list with the at least one user profile; and store the modified centralized list in the at least one storage device.

In some embodiments, the information contained in the screening document comprises a non-executable rendering of the object of security concern. The non-executable rendering of the object of security concern may comprise at least one of: an image representation of the object of security concern; if the object of security concern comprises instructions executable by the at least one document consumer, then text of the instructions; and information about the at least one document provider that provided the at least one user document containing the at least one object of security concern.

The screening document may further comprise at least one other option for the at least one user to indicate a scope of applicability of the information provided to the server, the scope of applicability being indicative of when the server should apply the information provided by the at least one user to determine whether to provide the object of security concern. The scope of applicability may include at least one of: applicability for a current session; applicability for the at least one document consumer from that point on; applicability for a particular external domain referenced in the at least one user document; applicability for a particular document provider; and applicability for a particular type of object of security concern.

In some embodiments, the data storage device in the server has at least one user profile associated with the at least one user, and the at least one processor is further operable to: associate the scope of applicability provided by the at least one user with the at least one user profile; and store the scope of applicability in the at least one data storage device.

In some embodiments, the server manages information relating to the centralized list based on intrinsic information obtained by the at least one processor from the at least one user document provided. The intrinsic information obtained by the at least one processor from the at least one user document may comprise at least one of: a source of the at least one user document; a type of the at least one user document; a type of the at least one object of security concern contained in the at least one user document; and when the at least one object of security concern contains at least one reference to another document, then information about the document that is referenced.

The server may centrally manage information relating to the centralized list based on location information indicative of the location in the server to which the at least one user document is provided. The server may centrally manage information relating to the centralized list based on extrinsic information provided by one or more users in response to one or more screening documents.

In some embodiments, the at least one object of security concern comprises at least one of: instructions executable by the at least one document consumer in JavaScript language; instructions executable by the at least one document consumer to obtain information from an external domain.

According to another embodiment, there is provided a server for securing documents. The server comprises at least data storage device for storing a plurality of user documents, at least one of the user documents containing at least one object of security concern, at least one network device for connecting to at least one document provider and at least one document consumer, the at least one document provider operable to provide at least one of the user documents to the server, the at least one document consumer operable to receive at least one of the plurality of user documents from the server, and at least one processor coupled to the at least one data storage device and the at least one network device. The at least one processor in the server is operable to determine whether to provide the at least one object of security concern in the at least one of the user documents concern to the at least one document consumer based on at least one security setting. If it is determined that the at least one object of security concern should be provided, then the at least one processor is operable to provide the at least one user document with the at least one object of security concern to the at least one document consumer. If it is determined that the at least one object of security concern should not be provided, then the at least one processor is operable to generate at least one replacement document containing the at least one user document without the at least one object of security concern and an indication that the at least one object of security concern has been excluded, and to provide the at least one replacement document to the at least one document consumer.

According to another embodiment, there is provided a method for securing documents at a server having at least one server processor and at least one data storage device. The method comprises receiving at least one document from at least one document containing at least one object of security concern, storing the at least one document in at least one data storage device, using the at least one server processor to determine whether to provide the at least one object of security concern to at least one document consumer based on at least one security setting. If it is determined that the at least one object of security concern should be provided, then the method comprises using the at least one server processor to provide the at least one document with the at least one object of security concern to the at least one document consumer. If it is determined that the at least one object of security concern should not be provided, then the method comprises using the at least one server processor to generate at least one replacement document containing the at least one document without the at least one object of security concern and further containing an indication that the at least one object of security concern has been excluded, and providing the at least one replacement document to the at least one document consumer.

The method may further comprise generating at least one screening document containing information about the at least one object of security concern; providing the least one screening document to the at least one document consumer such that at least one user of the at least one document consumer is able to use that information to assess security risk associated with the object of security concern; and providing at least one option for the at least one user to provide preference information to the server, the preference information being indicative of whether to provide the object of security concern to the at least one document consumer.

The method may further comprise associating the preference information provided by the at least one user to the server indicative of whether to provide the at least one object of security concern with at least one user profile associated with the at least one user; and storing the preference information in the at least one data storage device.

In some embodiments, the at least one security setting comprises at least one centralized list, and the method further comprises modifying the at least one centralized list for the at least one user based on the preference information provided by the at least one user in response to the screening document; associating the modified centralized list with the at least one user profile; and storing the modified centralized list in the at least one storage device. In some embodiments, the information contained in the screening document comprises a non-executable rendering of the object of security concern.

The non-executable rendering of the object of security concern may comprise at least one of: an image representation of the object of security concern; if the object of security concern comprises instructions executable by the at least one document consumer, then text of the instructions; and information about the at least one document provider that provided the at least one user document containing the at least one object of security concern.

The screening document further comprises at least one other option for the at least one user to indicate a scope of applicability of the information provided to the server, the scope of applicability being indicative of when the server should apply the information provided by the at least one user to determine whether to provide the object of security concern.

The scope of applicability may include at least one of: applicability for a current session; applicability for the at least one document consumer from that point on; applicability for a particular external domain referenced in the at least one user document; applicability for a particular document provider; and applicability for a particular type of object of security concern.

The data storage device in the server may have at least one user profile associated with the at least one user, and the method may further comprise associating the scope of applicability provided by the at least one user with the at least one user profile; and storing the scope of applicability in the at least one data storage device.

The method may further comprise managing information relating to the centralized list based on intrinsic information obtained by the at least one processor from the at least one user document provided. The intrinsic information obtained by the at least one processor from the at least one user document may comprise at least one of: a source of the at least one user document; a type of the at least one user document; a type of the at least one object of security concern contained in the at least one user document; and when the at least one object of security concern contains at least one reference to another document, then information about the document that is referenced.

The method may further comprise centrally managing information relating to the centralized list based on location information indicative of the location in the server to which the at least one user document is provided.

The method may further comprise centrally managing information relating to the centralized list based on extrinsic information provided by one or more users in response to one or more screening documents.

According to another embodiment, there is provided a non-transitory computer readable medium comprising instructions executable by a processor to cause the processor to receive at least one document containing at least one object of security concern from at least one document provider, store the at least one document in at least one storage device, determine whether to provide the at least one object of security concern to at least one document consumer based on at least one security setting. If it is determined that the at least one object of security concern should be provided, then the instructions causes the processor to provide the at least one document with the at least one object of security concern to the at least one document consumer.

If it is determined that the at least one object of security concern should not be provided, then instructions causes the processor to generate at least one replacement document containing the at least one document without the at least one object of security concern and an indication that the at least one object of security concern has been excluded, and to provide the replacement document to the at least one document consumer.

DRAWINGS

The embodiments herein will now be described, by way of example only, with reference to the following drawings, in which.

DESCRIPTION OF VARIOUS EMBODIMENTS

It will be appreciated that numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way, but rather as merely describing the implementation of various embodiments as described herein.

The embodiments of the systems and methods described herein may be implemented in hardware or software, or combinations of both. However, these embodiments may be are implemented in computer programs executing on programmable computers each comprising at least one processor, a data storage device (including volatile and non-volatile memory and/or other storage elements), at least one input device, and at least one output device. For example and without limitation, the programmable computers may be a mainframe computer, server, personal computer, laptop, personal data assistant, tablet computer or cellular telephone. Program code may be applied to input data to perform the functions described herein and generate output information. The output information may be applied to one or more output devices in known fashions.

Each program may be implemented in a high level procedural or object oriented programming and/or scripting language to communicate with a computer system. However, the programs can be implemented in assembly or machine language, if desired. In any case, the language may be a compiled or interpreted language. Each such computer program may be stored on a storage media or a device (e.g., read only memory (ROM) or magnetic diskette) readable by a general or special purpose programmable computer, for configuring and operating the computer when the storage media or device is read by the computer to perform the procedures described herein. The inventive system may also be considered to be implemented as a non-transitory computer-readable storage medium, configured with a computer program, wherein the storage medium so configured causes a computer to operate in a specific and defined manner to perform the functions described herein.

Figure 1:
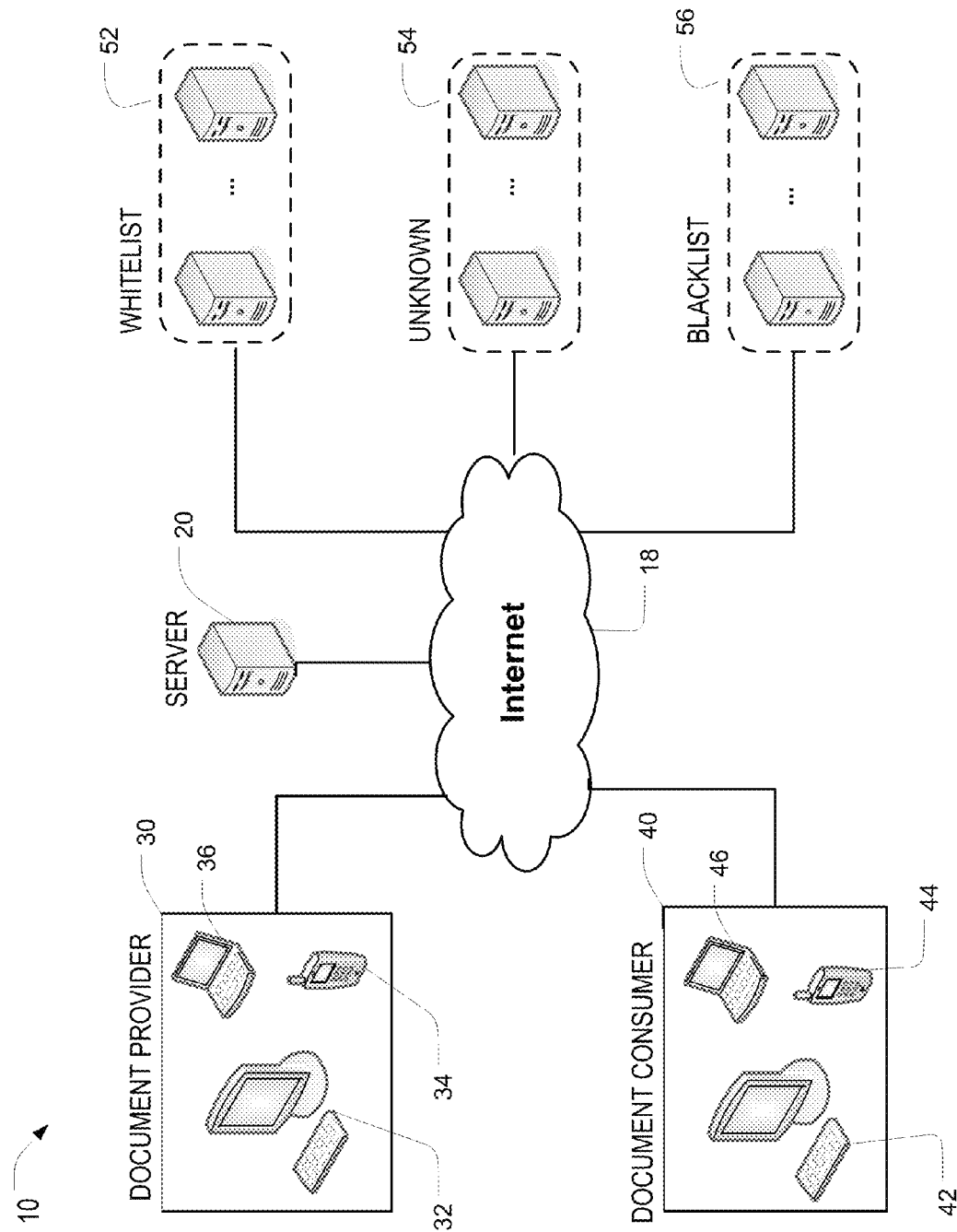
FIG. 1 is a block diagram illustrating the connection between components of a system for securing documents according to one embodiment.
Figure 2:
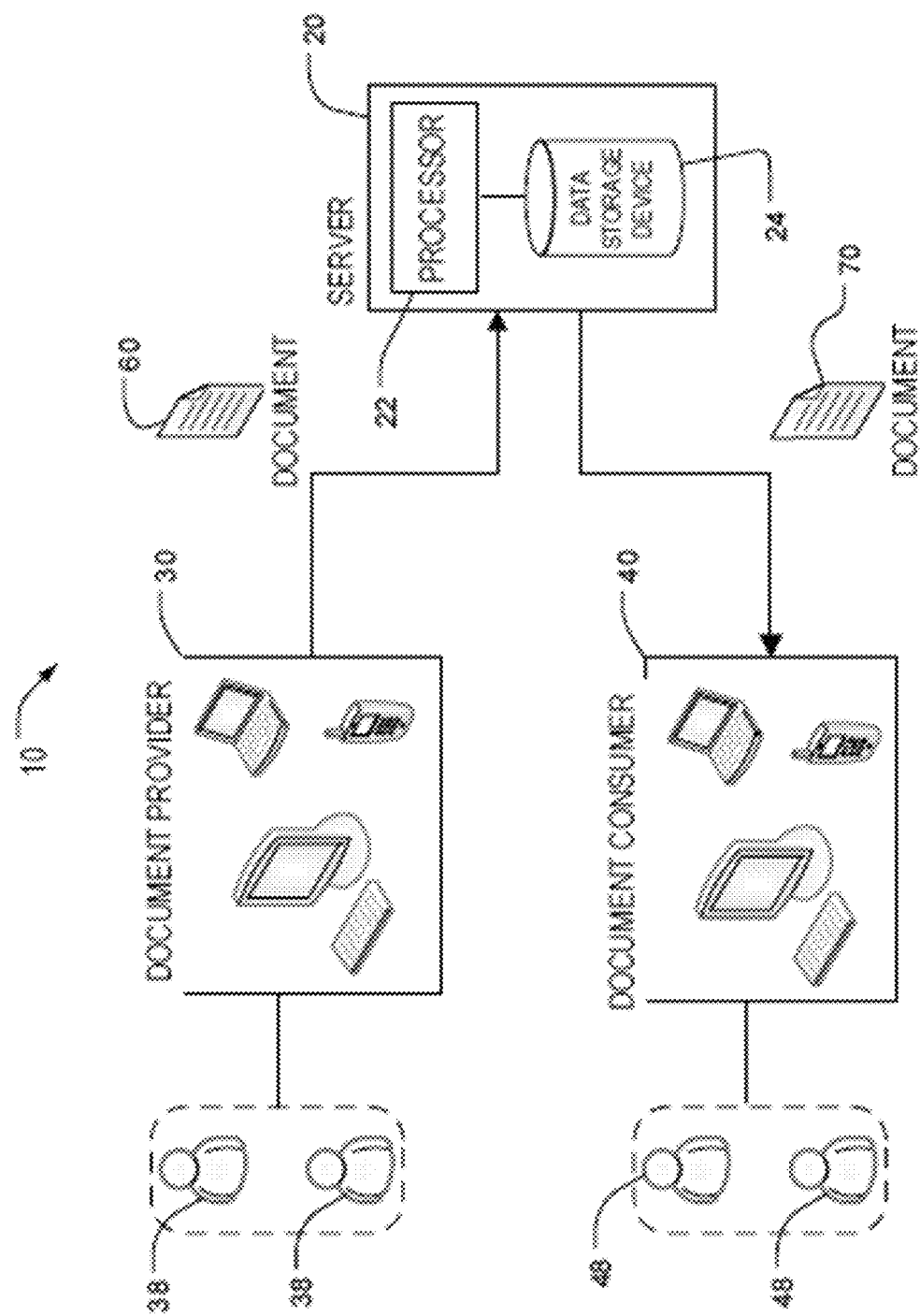
FIG. 2 is a block diagram illustrating the components of the system shown in FIG. 1.

Referring now to FIGS. 1 and 2, illustrated therein is a system 10 for securing user documents according to one embodiment. The system 10 generally includes a server 20, a document provider 30, and a document consumer 40. As shown, the server 20 may be connected to the document provider 30 and document consumer 40 through the Internet 18.

The server 20 generally has at least one processor 22 and at least one data storage device 24.

The document provider 30 is operable to provide at least one user document 60 to the server 20 for storage in the at least one data storage device 24.

Figure 3:
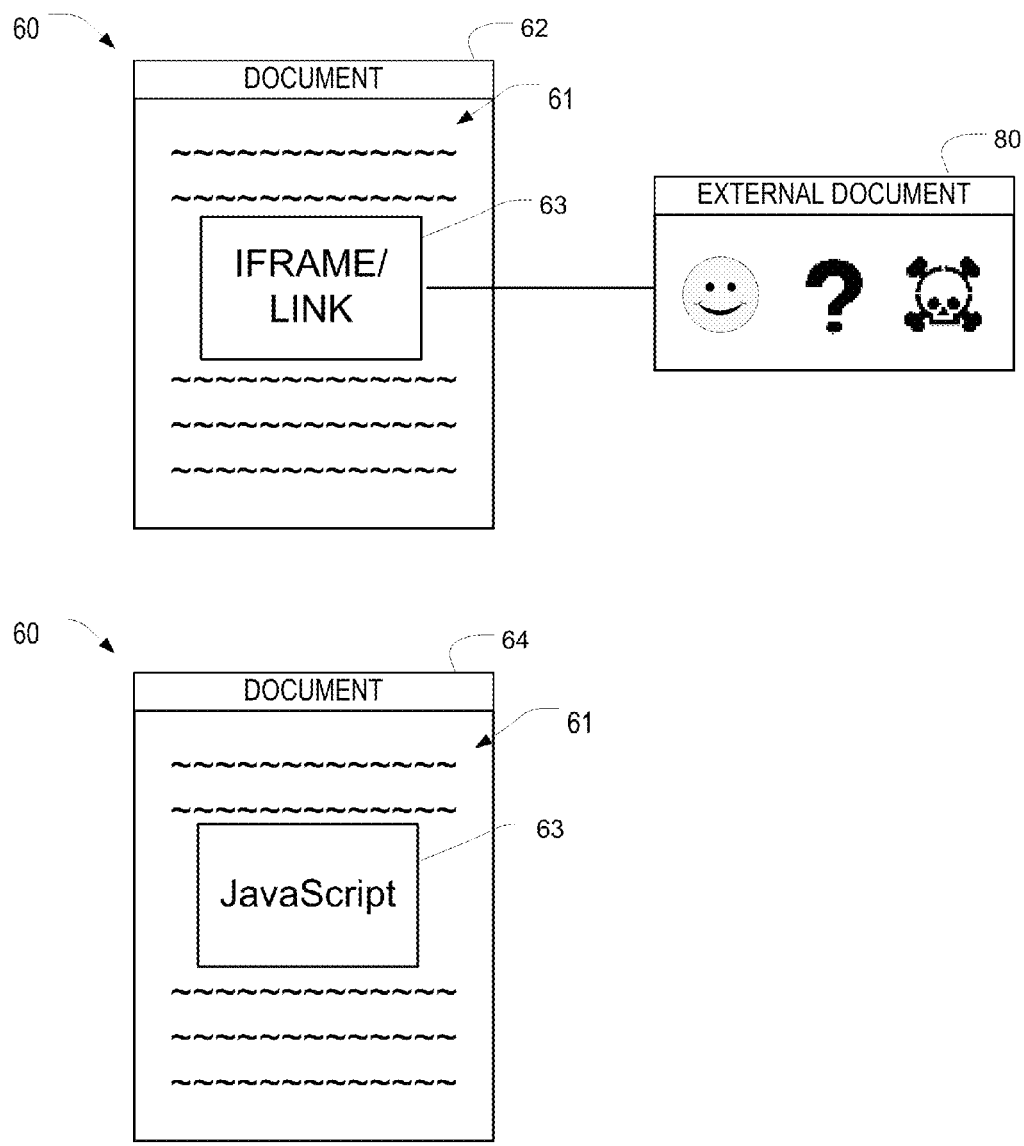
FIG. 3 is a block diagram illustrating exemplary user documents provided by the document provider shown in FIG. 1.

The at least one user document 60 contains at least one object of security concern 63 (as shown for example in FIG. 3).

The document consumer 40 is generally operable to receive the at least one user document 60 provided by the document provider 30 from the server 20.

The processor 22 of the server 20 is operable to determine whether to provide the at least one object of security concern 63 to the at least one document consumer 40 based on at least one security setting. For example, if it is determined that the object of security concern 63 should be provided, the processor 22 can then provide the at least one user document 60 with the at least one object of security concern 63 to the at least one document consumer 40.

However, if it is determined that the at least one object of security concern 63 should not be provided (e.g., due to security concerns), the processor 22 is operable to generate at least one replacement document 74 containing the uploaded user document 60 (without the at least one object of security concern 63) and an indication 75 that the at least one object of security concern 63 has been excluded, and then provide this replacement document 74 to the at least one document consumer 40.

The document provider 30 is a computing device connected to the Internet 18, and through the Internet 18 to the server 20. The document provider 30 may be a desktop computer 32, a mobile computing device 34 such as a smart phone, a laptop 36, and so on. Generally, the document provider 30 has at least one processor, at least one data storage device and at least one network module configured to communicate with a network to access the Internet 18.

In some embodiments (e.g., depending on the type of device), a cellular network, Ethernet network, IEEE 802.11 compliant wireless network or some combination thereof may be used to access the Internet 18. The network module generally includes suitable hardware and/or software components that facilitate access to such networks.

Generally, one or more users may use the document provider 30 to access the server 20. Each of the users may have an associated user profile 38. The user profile 38 will generally contain profile information about the user associated with that profile such as the user's name, an email address, login information (login ID and password), and so on.

The document consumer 40 may be similar to the document provider 30. For example, the document consumer 40 may be a computing device connectable to the Internet 18, and through the Internet 18 to the server 20. The document provider 40 may be a desktop computer 42, a mobile computing device 44 such as a smart phone, a tablet computer, a laptop 46, and so on. Generally, the document consumer 40 has a processor, a data storage device and a network module configured to communicate with a network to access the Internet 18. Depending on the type of device, a cellular network, Ethernet network, or IEEE 802.11 compliant wireless network may be used to access the Internet 18.

In specific embodiments, for example, in an online educational community, the profile information may contain additional information related to the community such as the role of that user in the education community (e.g., instructor, student, administrator). The profile information may include information that is indicative of a level of access granted to a particular user. For example, the user profile 38 with an assigned role of an "instructor" will generally have a higher access level than the user profile 38 with an assigned role of a "student". The access level may limit actions that the user profile 38 may perform on the server 20.

The user profiles 38 may be stored in the data storage device 24 on the server 20. Storing the user profiles 38 in a centralized location such as the server 20 may allow the user associated with a specific user profile 38 to access that user profile 38 from different devices and/or locations. For example, the user may access his user profile 38 via a desktop 32, a mobile computing device 34, or a laptop 36.

The system 10 may require the user to successfully authenticate before providing access to their user profile 38. Security authentication may involve providing a user name and associated password to the server 20. In some circumstances, a user may access the system using a guest or a generic user profile 38. This may occur if the user does not have an associated user profile 38 or if he is unable to authenticate him or herself.

In some embodiments, it may be desirable to have a user profile 38 include specific (e.g., non-generic) information about the associated user when providing the user document 60 to the server 20. The profile information associated with that user profile 38 may then be recorded with the user document 60 that is provided. This information may be used to determine whether to provide one or more objects of security concern 63 contained in the user document 60.

Referring again to FIG. 3, the user document 60 generally contains content information 61 that the user of the document provider 30 wishes to share. In some examples, the user document 60 may be a web page programmed in HTML or another suitable language. Content information may include text, images, audio, video or any other information that can be shared over the Internet. As part of the content 61, the user document 60 may also contain one or more objects of security concern 63.

The object of security concern 63 may be any data provided in the user document 60 that may cause the document consumer 40 to function in an undesired manner.

The object of security concern 63 may include instructions executable by the document consumer 40 to produce undesirable results. Generally, the web browser application offers a level of protection for scripts that it executes. For example, the web browser application will generally not permit scripts to modify files other than its own narrowly defined "cookie" files. However, there may be plug-in applications installed within the web browser application that may not adhere to the security policy of the web browsers.

As such, instructions provided to these plug-in applications, when executed, may harm the file-system in the document consumer 30, breach privacy of the files stored in the document consumer 30 or otherwise cause harm to the document consumer 30. Generally, the instructions that may cause harm to the document consumer 40 are flagged as one or more objects of security concern 63. For example, a set of instructions in a scripting language, such as the JavaScript language as shown in the user document 64, may be flagged as an object of security concern 63.

The object of security 63 concern may also be instructions executable by the document consumer 40 to obtain information from an external domain. For example, the object of security concern 63 may be a hotlink to an external website 80 from a different domain. A hotlink (also known as a direct or inline link) will cause the document consumer 40 to obtain information (e.g., an image or text) from another website other than the server 20, usually without the knowledge by or requiring consent of a user of the document consumer 40.

In some cases, hotlinks may be used for phishing attacks that fraudulently attempt to obtain sensitive information from a user, which may then be used to perpetuate unscrupulous activities such as credit card fraud or identity theft. For example, a phishing attack may be perpetuated by planting hotlinks to unscrupulous domains in a legitimate document to obtain the confidence of a victim.

In another example, the object of security concern 63 may be an iFrame displaying information from an external website 80 from a different domain. Generally, an iFrame is a feature provided in HTML that causes the browser application to create a window or a frame within a document that displays a different document from a different source.

In addition to vulnerability to phishing attacks, an object of security concern 63 that has external links may be used to circumvent an organization's content policy. For example, the server 20 may be managed and controlled by an organization such as an educational institution. The document providers 30 may be used by students, instructors or administrative staff to upload content in documents, such as course material or personal items (e.g., blogs, personal home pages) to be shared with other members of the organization. The organization may exercise some degree of control over the content to prevent dissemination of undesired information (e.g., hateful speech, adult or violent material, and so on) using various content filters.

However, conventional filters used by the organization will generally not be able to filter out content received through the external links provided in documents. As such, embodiments herein can offer a measure of protection against hotlinks or any other instructions executable by the document consumer 40 to obtain information from an external domain.

Despite the noted potential for security breaches by content 61 of some documents, particularly by an object of security concern 63, some of the content 61, including the objects of security concern 63, may be beneficial to a user of the document consumer 40. For example, external links may link to helpful and regularly updated documents on external domains. Furthermore, the instructions that can cause harm in some circumstances may also facilitate useful functions such as providing flash animations or other engaging means of conveying information. Because of the potential for beneficial integrations, categorically blocking all objects of security concern 63 is generally undesirable.

In some cases, one approach is for applications or systems to categorically block external links or warn a user when a document attempts to access an external link, but provide the user with the capability to override the block or warning. A user input may then be required to acknowledge the warning and/or override the block. However, because there may be a plurality of external links, requiring user input for each external link may become cumbersome and is also generally undesirable.

To address at least some of the above concerns, the processor 22 on the server 20 may be operable to determine whether to provide objects of security concern 63 in uploaded user documents 60 to the document consumer 40 based on at least one security setting.

In some embodiments, the security settings may include one or more centralized lists managed by the server 20, and which may be applicable to all the documents provided by the document provider 30. Because the centralized list is generally applicable to all documents provided by the document provider 30, amendments to the centralized list 30 can easily cause changes in all the documents.

In some embodiments, the centralized list may include a black list 56. The black list 56 can indicate objects of security concern 63 that should not be provided to the at least one document consumer 40.

In some embodiments, the centralized list may include a white list 52. The white list 52 generally indicates objects of security concern 63 that should be provided to the at least one document consumer 40.

In some embodiments, objects that are not identified in either the black list 56 or the white list 52 may be referred to generally as unknown objects 54.

The contents of each list 52 and 56 may include various "types" of objects of security concern 63, "sources" of the document provided, and other information about external links that the objects of security concern 63 may link to.

In some cases, the "types" of objects of security concern 63 may include the types of instructions executable by the document consumer 40 such as JavaScript or Multipurpose Internet Mail Extensions (MIME) types. Information about external links may include domain names, URL extensions, title of the externally linked document, or web pages. The source of the document may include author information, which may include the name of the person (i.e. the author of the document) who created the document and/or the user profile 38 that provided the document to the server 20.

In some embodiments, the white list 52 may include a list of trustworthy user profiles 38, and the black list 56 may include a list of untrustworthy user profiles 38. The server 20 may be configured to determine whether the user profile 38 that uploaded the document that contains the object of security concern 63 is on the black list 56 or the white list 2 and based on this information determine whether to provide the object of security concern 63. The server 20 may be configured to determine whether a user profile 38 is trustworthy based on previous actions associated with that user profile 38. For example, if the user profile 38 has uploaded a predetermined number of documents containing objects of security concern 63, the user profile may be deemed to be untrustworthy. Similarly, if the user profile has uploaded more than a predetermined percentage of documents containing objects of security concern 63, the user profile 38 may be deemed to be untrustworthy and placed on the black list 56. Conversely, the user profile 38 that has uploaded a certain number or percentage of documents containing objects of security concern 63 below a specified threshold may be deemed to be trustworthy and placed on the white lit 32. In some embodiments, the server 32 may be configured to analyze historical reclassifications of items associated with the user profile 38 which had previously been identified as objects of security concern 63 to determine if that user profile 38 should be on the white list 52 or the black list 56.

The information on the black list 56 and white list 52 may be used (e.g., referenced) by the processor 22 to determine whether to provide objects of security concern 63 to the document consumer 40.

Generally, a user may use the document consumer 40 to access the documents provided by the document provider 30. The user may have a user profile 48 associated with the user. In some cases, the user profile 48 may be the same as or similar to the user profile 38. In other cases, the user profile 48 may be different from the user profile 38.

In some cases, the same user profile (e.g., user profile 48) may be used to access both the document provider 30 and document consumer 40. For example, the user profile 48 associated with an instructor may be used to access a document provider 30 to upload user documents 60 containing course materials to the server 20 such that they are accessible by participants in a course. Once uploaded, the same user profile 48 may be used by the instructor to access the documents that were provided to the server 20, thereby acting as the document consumer 40.

In some cases, the system 10 may require the user to successfully authenticate before providing access to the user profile 48. Security authentication may involve providing a user name and associated password to the server 20. In some circumstances, the user may access the system using a guest or a generic user profile 48. This may occur if the user does not have an associated user profile 48 or if he is unable to authenticate himself.

In some embodiments, it may be desirable to have a user profile 48 include specific (e.g., non-generic) information about the associated user when accessing one or more documents 70 from the server 20. The user profile 48 may have associated information received in response to screening documents 90 which can be used to determine whether to provide one or more objects of security concern 63 contained in the user document 60.

The document consumer 40 is operable to receive the user document 60 provided by the document provider 30 that is stored in the data storage 24 on the server 20. Specifically, the document consumer may send one or more requests for the user document 60. In response, the server will send back one or more documents 70, which in some cases will be a copy of the user document 60. However, in other cases, the document 70 may exclude one or more objects of security concern contained in the user document 60.

Figure 4:
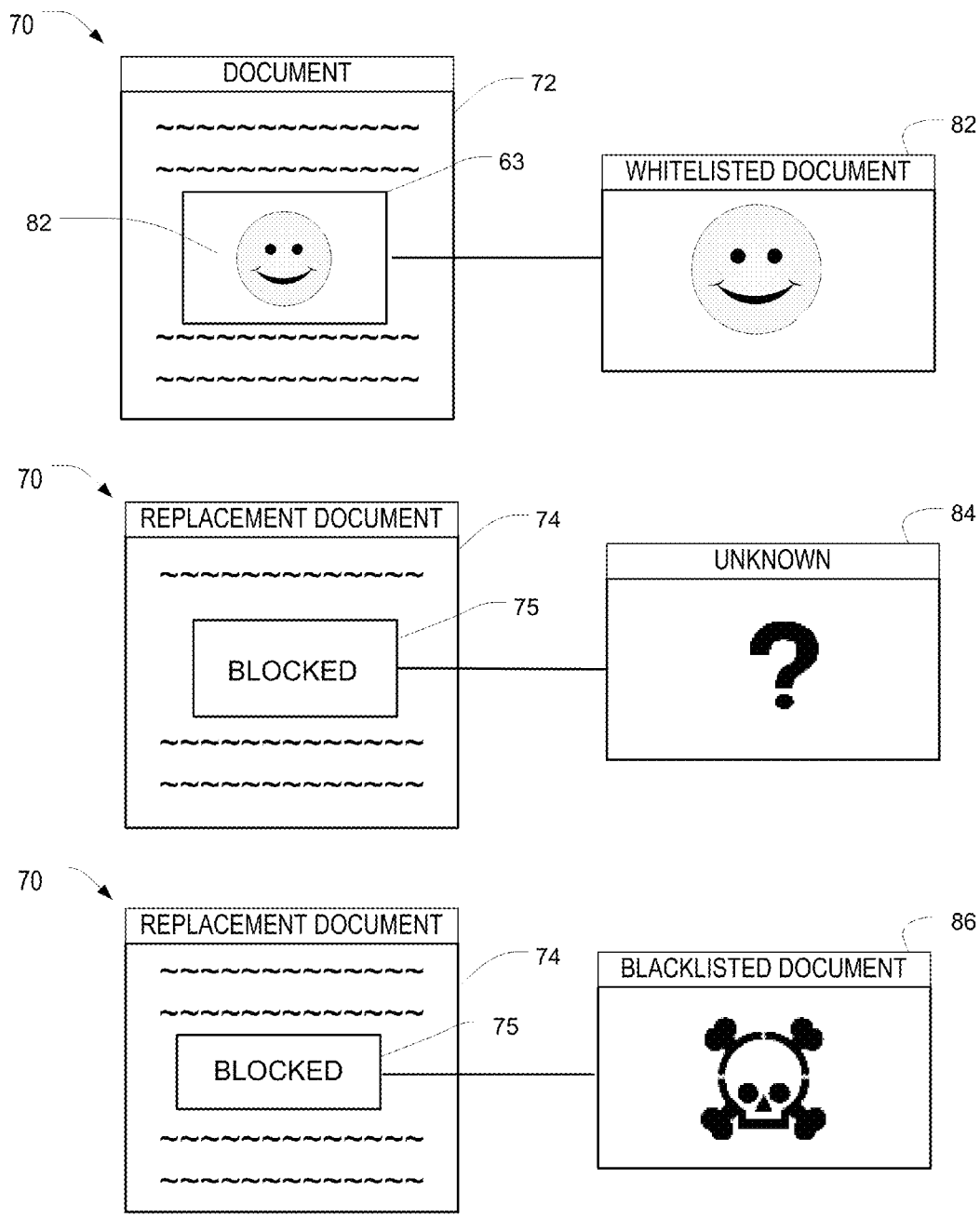
FIG. 4 is a block diagram illustrating exemplary user documents received by the document consumer shown in FIG. 1.

For example, if the processor 22 determines that the object of security concern 63 should be provided, the document 70 provided to the document consumer 40 includes that object of security concern 63. For example, referring to FIG. 4, if the object of security concern 63 comprises instructions 73 to download and display a whitelisted document 82 from a domain on the white list 52, then instructions to download and display the whitelisted document 82 are provided to the document consumer 40 as part of the document 72. The instructions may be automatically executed to download and display the whitelisted document 82 as shown.

In other embodiments, instead of providing the instructions to download and display the whitelisted document 82, the processor 22 may simply retrieve the whitelisted document 82 and provide it as part of the document 70.

However, if the processor 22 determines that the object of security concern 63 should not be provided, the document 70 provided to the document consumer 40 then includes a replacement document 74 generated by the processor 22. The replacement document 74 contains the provided user document 60 without the at least one object of security concern 63, and includes at least one indication 75 that the at least one object of security concern 63 has been excluded.

For example, if the object of security concern 63 comprises instructions to download and display a document 84 from a domain that is unknown, then the replacement document 74 provided to the document consumer 40 excludes the instructions to download, and in their place, includes an indicator 75 that indicates that the object of security concern 63 has been "blocked".

In another example, the same replacement page 74 may also be provided to the document consumer 40 if the object of security concern 63 comprises instructions to download and display a blacklisted document 86 from a domain on the black list 56.

In some embodiments, there may be a plurality of objects of security concern 63 in a single user document 60. In such cases, the document 70 may be a replacement document 74 that excludes one or more of the objects of security concern 63 and includes one or more other objects of security concern 63 that have been determined to be allowable.

Figure 5:
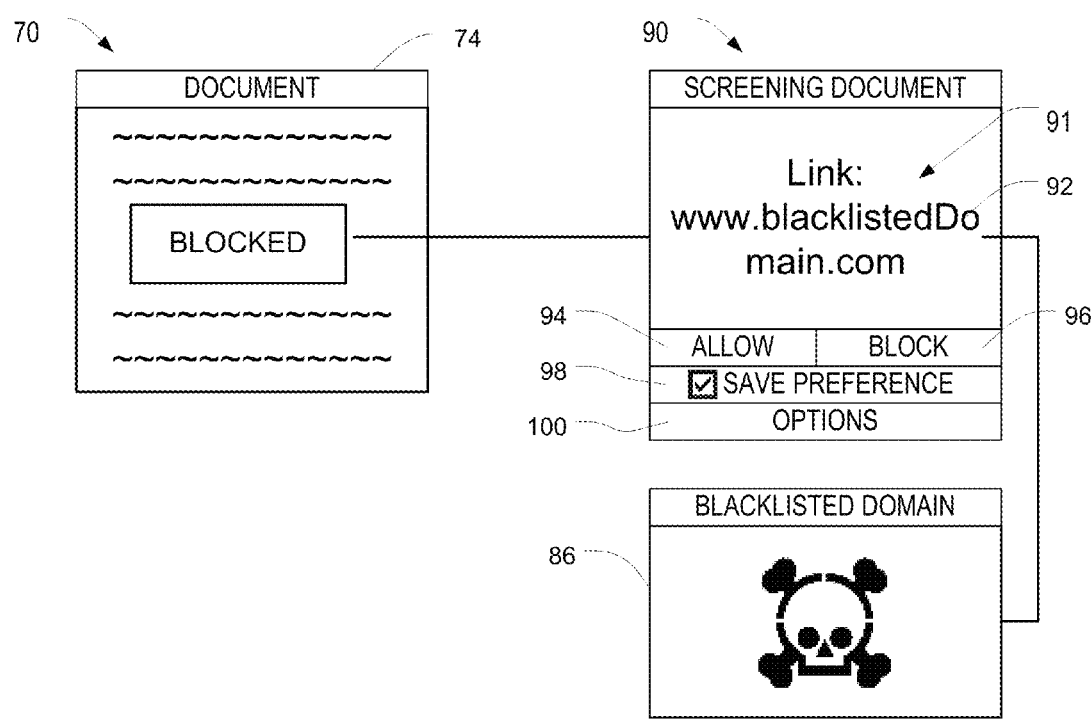
FIG. 5 is a block diagram illustrating an exemplary screening document generated by the server shown in FIG. 1.

Referring to FIG. 5, in some embodiments, the processor 22 may also generate a screening document 90 when the security object 63 is excluded from the document 70 that is provided to the document consumer 40. The screening document 90 may contain information 91 about the object of security concern 63 that was excluded such that the user of the at least one document consumer 40 may be able use that information to assess security risk associated with the object of security concern 63.

The screening document 90 may be accessed in different ways. For example, the indication 75 for a blocked object of security concern 63 may contain a link to the screening document 90. In another example, the screening document may be provided as part of the document 70. The screening document 90 may also be accessible even if the object of security concern 63 is allowed such that the user may instruct the server to block the object of security concern 63.

In some embodiments, the information 91 about the object of security concern 63 may include a non-executable rendering of the object of security concern 63. The type of information 91 about the object of security concern 63 may vary based on the type of object of security concern 63.

In the exemplary screening document 90 as shown in FIG. 5, the information 91 about the object of security concern 63 comprises information about the external site referenced by the object of security concern 63, namely the URL address information 92. This type of information 91 may be provided wherein when the object of security concern 63 includes instructions executable by the document consumer 40 to download and display one or more documents from an external site.

In another example, the information 91 about the object of security concern 63 may also include information about the user profile 38 that provided the user document 60 or information about the author of the user document 60. Information about the user profile 38 may include the user's role (e.g., instructor, student, administrative staff, or guest) in the system 10, the user's name, and so on. This may allow the document consumer 40 to assess whether the user document 60 is from a trustworthy source based on the information 91 provided, and if so, then elect to receive the objects of security concern 63 contained therein.

Figure 6:
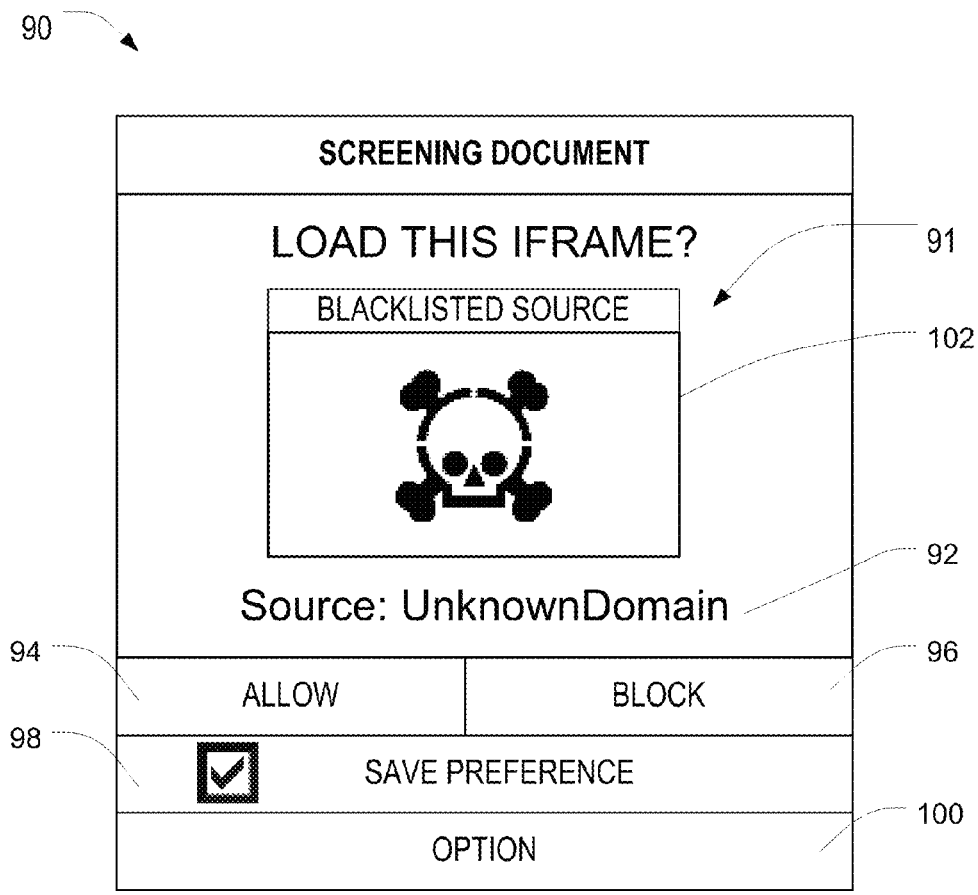
FIG. 6 is a block diagram illustrating another exemplary screening document generated by the server shown in FIG. 1.

In another example, as shown in FIG. 6, the non-executable information 91 that is provided may be an image representation 102 of the object of security concern 63 that was excluded. If the object of security concern 63 includes instructions executable by the document consumer 40 to download and display a document from an external domain, then the image representation 102 may be a screen capture of the document that was excluded. The image representation 102 may be useful to convey the "look and feel" of the external site to the document consumer 40. The "look and feel" of a document may be used by a user to assess whether the document is from a trustworthy domain.

Figure 7:
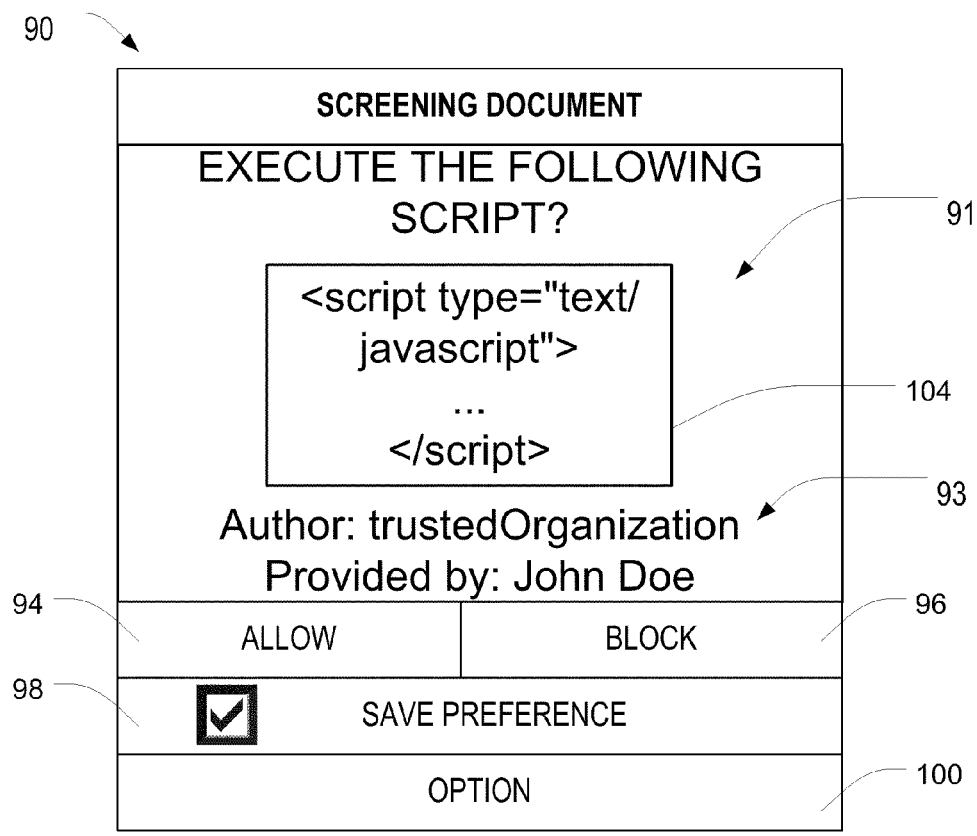
FIG. 7 is a block diagram illustrating another exemplary screening document generated by the server shown in FIG. 1.

In another example, as shown in FIG. 7, the information 91 provided may be a text rendering 104 of the object of security concern 63 that was excluded. In the example as shown in FIG. 7, the text rendering 104 contains non-executable text of javaScript displayed in a window. Depending on the length of the text, the window may be scrollable. The text rendering of the actual programming instructions may allow a more advanced user to discern risks associated with executing the instructions.

In some embodiments, the text rendering of the object of security concern 63 may include the type of object that was blocked, and/or a list of potential risks associated with the type of object that was blocked. This type of rendering may be more easily understood by a less sophisticated user.

In some embodiments, the screening document 90 may contain more than one type of information 91. For example, the exemplary screening document as shown in FIG. 7 also contains author information and profile information generally indicated by reference numeral 93 in addition to the text rendering 104.

The screening document 90 may also contain one or more options for the user to provide information to the server 20 indicative of whether to provide the object of security concern to the document consumer 40. In the exemplary screening document as shown, the options include an "ALLOW" button 94 and a "BLOCK" button 96. Clicking on the allow button 94 will indicate to the server 20 to permit the object of security concern to be provided to the document consumer 30. Conversely, clicking on the block button 96 will indicate to the server to exclude the object of security concern 63 from the document 70 provided.

The screening document 90 may also have an input option to save the user's decision for subsequent use. Generally, this option may only be available the user is successfully associated with a user profile 48.

In the document 90 as shown, the input option is a checkbox 98 labeled "Save Preference". The save preference checkbox 98 could be used to indicate to the system to apply the user's decision in the future. If the save preference checkbox 98 is selected when the user's decision to allow or block the object of security concern is communicated to the server 20, the processor 22 may associate the information provided with the user profile 48 associated with the user and store that information in the data storage device 24. Subsequently, when similar objects of security concern 63 are encountered, the processor 22 may refer to the information associated with the user profile to attempt to decide whether to provide the object of security concern 63 before seeking user input. In some embodiments, the user's decision in response to one or more screening documents 90 may overrule the centralized black list 56 and white list 52.

The screening document 90 may also provide input options for the user to indicate a scope of applicability of the information provided to the server 20. The scope of applicability may be indicative of when (e.g., under what circumstances) the server 20 should apply the information provided by the user to determine whether to provide the object of security concern 63 in the future.

In some embodiments, the scope of applicability may extend to a particular program. In some embodiments, the scope of applicability may extend to a particular tool. For example, in a program that generates and displays quizzes to users, the scope of applicability may extend to the content of the quiz. Accordingly, such a scope of applicability may allow or disallow an object of security concern within the contents of a generated quiz. However, the scope of applicability may also extend to the responses provided by the users to the contents of the quiz.

Figure 8:
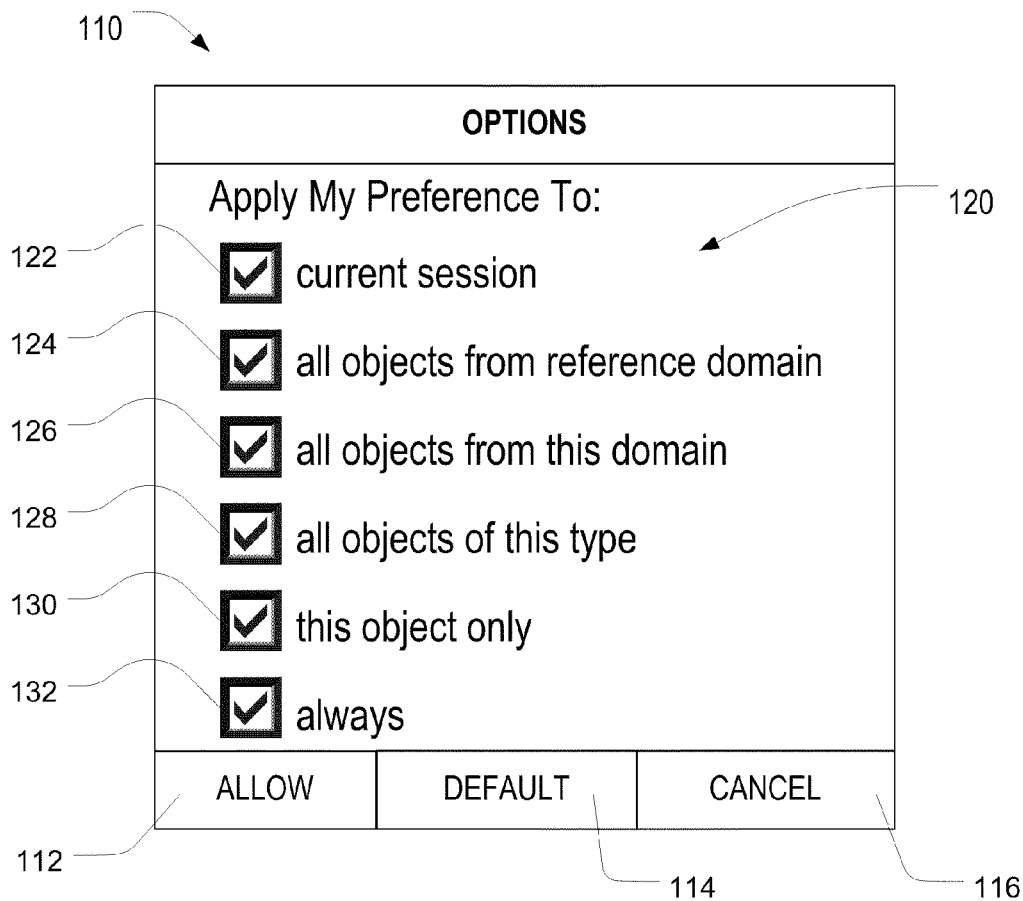
FIG. 8 is a block diagram illustrating an exemplary options document for indicating scope of applicability generated by the server shown in FIG. 1.

The options to indicate the scope of applicability may be presented on the same document or on different documents. In the embodiment as shown in FIG. 8, for example, the options to indicate the scope of applicability are shown on a different page. As shown, an exemplary document 110 contains various options 120 that the user may select to indicate the scope of applicability of the decision for the object of security concern 63. The document may be accessed by clicking on the button 100 labeled as "Options" (shown in FIG. 7).

The user may select to apply his decision to a current session by selecting checkbox 122 labeled "current session". The scope of a current session may generally approximate an amount of time that the user uses the document consumer 40 in one sitting. The length of the session may be inferred from various activities of the user. For example, if the user logs in at each session to an associated user profile 48, then the scope of the current session may apply until the user logs out of the associated user profile 48.

In another example, a server 20 may determine that a user profile has effectively logged out if there has been no activity associated with that user profile 48 for a certain period of time (e.g., a timeout). For example, if the user profile 48 has not requested any documents from the server for a given time, then the server may determine that the current session has ended.

There are other ways of determining when a session has ended, even without an associated user profile 48. For example, network address information (e.g., IP address) of the document consumer 40, and/or cookies containing unique session identifier may be used to approximate the duration of the current session.

If the object of security concern 63 comprises a reference to an external domain, the user may select to apply his decision to all documents from that external domain by selecting the checkbox 124 labeled "all documents from the referenced site". This option will indicate that the user's decision should be applied to all objects received from that particular domain. Generally, the user may select this option if the user feels that the referenced domain is a trustworthy domain and that all information, including objects of security concern 63 from that site, should be allowed. Conversely, the user may select this option in combination with a BLOCK decision if the user feels that the reference domain is not a trustworthy site and all objects from that domain should be blocked.

The user may elect to apply his decision to all objects from the current domain by selecting the checkbox 126 labeled "all documents from this domain". This may indicate to the server 20 that the current domain from which the document containing the object of security concern is received is trustworthy and that all objects of security concern from the current domain should be allowed. Conversely, this may indicate to the server that the current domain is untrustworthy and that all objects of security concern 63 from the current domain should be blocked.

The scope of applicability may be for all files of a particular type. For example, the user may elect to apply his decision to all files of a particular type by selecting the checkbox 128 labeled "all files of this type". This option is generally provided when the object of security concern 63 comprises instructions executable by the document consumer 40 to provide a functionality. Selecting the checkbox 128 may indicate to the server that the instructions of this particular type (e.g., flash, JavaScript) are considered to be "safe" or "unsafe" by the user and should be "allowed" or "blocked", respectively, during subsequent sessions.

The user may elect to apply his decision only to this particular object of security concern 63 by selecting the checkbox 128 labeled "this object only". This is the most limited scope of applicability in that the decision will only applied to this particular object of security concern 63 at this time. In this case, the processor 22 may not associate the user's decision with the user profile and save the association because the decision may not be used for subsequent sessions.

The user may select the checkbox 132 labeled "always" to elect to apply his decision to all types of objects of security concern, from all documents, for all the time in the future. This may result in the processor blocking or allowing each and every object of security concern 63 for that user profile 48.

In some embodiments, the selections provided by the user will be allowed to override the contents of the centralized black list 56 and white list 52. In other embodiments, only some of the decisions provided by the user will be allowed to override some of the contents of the centralized black list 56 and white list 52. For example, the user may be permitted to block objects of security concern 63 that are on the black list 56 but not allow objects of security concern 63 that are on the black list 56.

In some embodiments, the centralized lists 52, 56 may contain information about when a user's preference should be allowed to override its contents. This may be on an object by object basis, or may be more generalized (e.g., as an organizational policy).

To apply the user's decision to the selected scope of applicability, the processor 22 may associate each user decision with the user profile 48, and save the association on the data storage device 24. The processor 22, when determining whether to provide objects of security concern 63 to the document consumer 40 in the future may consider decisions associated with the user profile 48 that is requesting the document 70.

Figure 9:
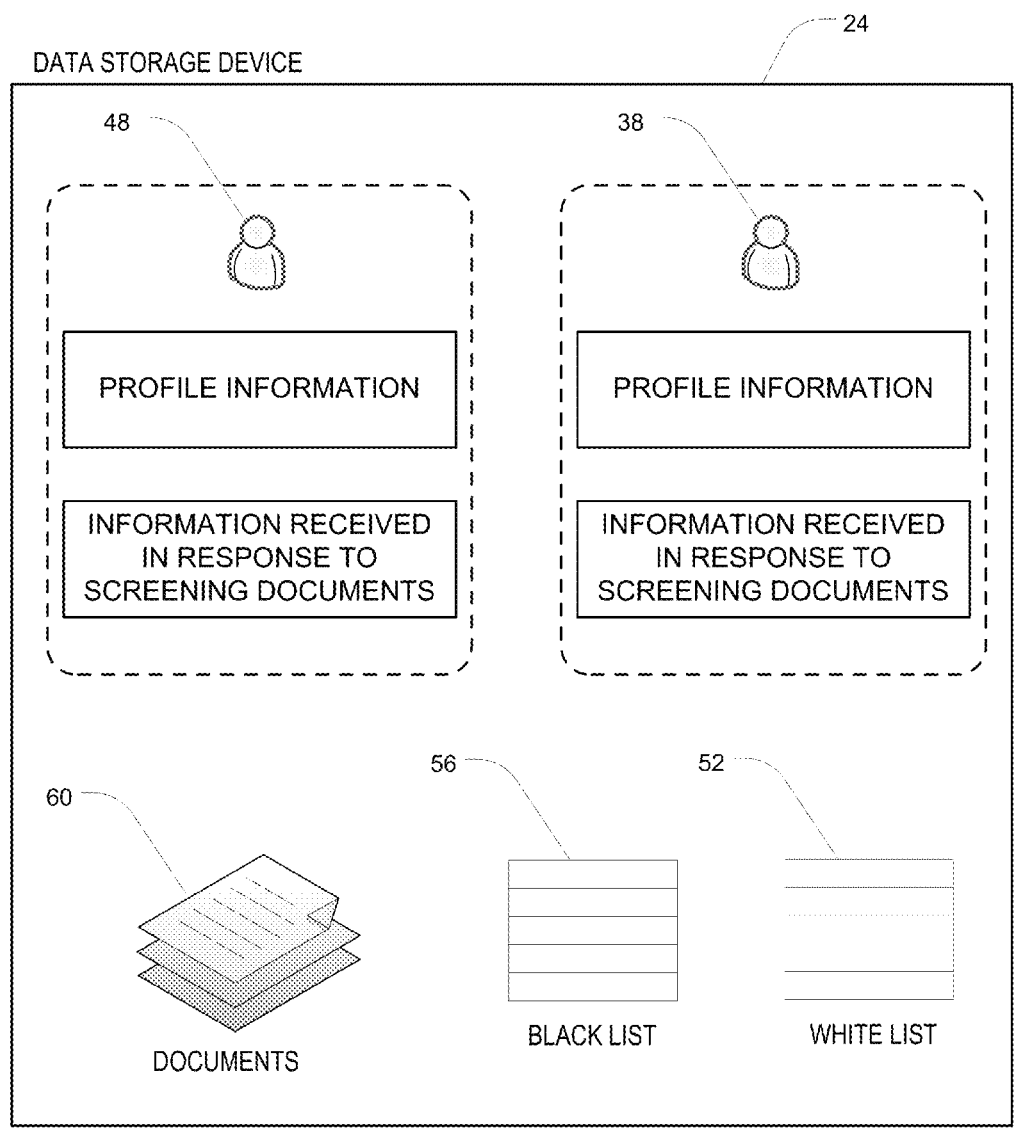
FIG. 9 is a block diagram illustrating exemplary contents of the data storage device shown in FIG. 1.

Referring now to FIG. 9, illustrated therein are the exemplary contents of the data storage device 24 according to one embodiment. The data storage device 24 contains user documents 60 provided by document consumers 30 as well as security settings, including the centralized black list 56 and white list 52. The data storage 24 also stores user profiles 38 and 48. Each of the user profiles 38 and 48 has profile information (e.g., user name, login information, role, etc.) associated with that user profile. In addition, the user profile may also have information received in response to screening documents associated with it.

Figure 10:
FIG. 10 illustrates the information received in response to screening documents in the data storage device of FIG. 1 organized as a table.

The information received in response to screening documents is shown organized in the form of a table 120 in FIG. 10. The table contains information about the decisions associated with that user profile rendered whether to provide objects of security concern in response to screening document 90 and/or the options document regarding the scope of applicability.

In another example, a personalized black list and a white list for a user profile 48 may be generated based on information provided by the user in the decisions and/or scope of applicability provided in response to the screening documents 90. In some cases, the contents of the personalized black list and white list may override the information provided in the centralized black list 56 and white list 52.

The personalized black list and white list may be generated by creating a copy of the centralized black list 56 and white list 52, and modifying it in accordance with the information obtained from the screening document, and saving the modified black list and white list as the personalized black list and white list. This modified black list and white list may be consulted when determining whether to provide an object of security concern 63 to the document consumer 40.

In another embodiment, the personalized black list and white list may be consulted first by the processor 22, and only when there is no information on the personalized lists about an object of security concern, the processor will consult the centralized lists 52 and 56. This embodiment effectively allows the personalized list to override the centralized lists 52 and 56.

The information provided by user in response to screening documents may also be utilized to amend the contents of the white list 52 and the black list 56. For example, if a predetermined number of users indicated that an object of security concern should be allowed, then the centralized lists 52, 56 may be modified to allow that object of security concern in the future. In some examples, the roles of the users in the organization that made the decision to allow or disallow may be considered. That is, if the user is an instructor, his decision may be given additional weight than if he is a student.

The trustworthiness of the users in the organization that made the decision to allow or disallow may also be considered when amending the contents of the lists 52 and 56. In other words, the server may be configured to analyze historical usage data associated with a particular user profile such as providing objects of security concern 63 having links to external documents, and/or classifying objects of security concern 63 (e.g. external links or externally linked documents) on the lists 52 and 56. Based on the trustworthiness of the particular user profile, the server may accept or deny the classification provided by the user. For example, if the server determines that the user profile is trustworthy, then the server may accept the classification provided by the user and modify the centralized lists accordingly.

The contents of the centralized black list and white list may also be modified by a user with an appropriate level of access such as a system administrator who has an administrative role for the server. The administrator may place a particular type of objects of security concern on the black list, for example, in response to security threats associated with that type of object of security concern.

The administrator may place one or more user profiles on the black list to indicate that all objects of security concern from that user be blocked. This may be in response to one or more violations of organizational policy by that user profile. Conversely, the administrator may place a particular user profile on the white list to indicate that all objects of security concern in the documents received from that user profile should be allowed.

While certain features have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The invention claimed is:

1. A system for securing documents comprising:
    a) a server having at least one processor and at least one data storage device for storing documents;
    b) at least one document provider connected to the server, the at least one document provider operable to provide at least one user document to the server for storage in the at least one data storage device, the at least one user document containing at least one object of security concern and being associated with a user profile of a user providing the document; and
    c) at least one document consumer connected to the server, the at least one document consumer operable to receive the at least one user document containing the at least one object of security concern from the server;
    d) wherein the at least one processor in the server is operable to:
        i) determine whether to provide the at least one object of security concern to the at least one document consumer based on a first security setting associated with a user profile of a user receiving the document and a second security setting associated with the user profile of the user providing the document;
        ii) if it is determined that the at least one object of security concern should be provided, provide the at least one user document with the at least one object of security concern to the at least one document consumer, and
        iii) if it is determined that the at least one object of security concern should not be provided, then:
            (1) generate at least one replacement document containing the at least one user document without the at least one object of security concern and including an indication that the at least one object of security concern has been excluded, and
            (2) provide the at least one replacement document to the at least one document consumer;
    e) wherein each user profile includes profile information about the user associated with that profile including information that is indicative of a level of access granted to each user.

2. The system according to claim 1, wherein the first security setting includes at least one centralized list managed by the server.

3. The system according to claim 2, wherein the at least one centralized list comprises a black list indicative of a list of objects of security concern that should not be provided to the at least one document consumer.

4. The system according to claim 2, wherein the at least one centralized list comprises a white list indicative of a list of objects of security concern that should be provided to the at least one document consumer.

5. The system according to claim 2, wherein the at least one centralized list is applicable to all user documents provided by the at least one document provider.

6. The system according to claim 2, wherein the server manages information relating to the centralized list based on intrinsic information obtained by the at least one processor from the at least one user document provided.

7. The system according to claim 6, wherein the intrinsic information obtained by the at least one processor from the at least one user document comprises at least one of:
    a) a source of the at least one user document;
    b) a type of the at least one user document;
    c) a type of the at least one object of security concern contained in the at least one user document; and
    d) when the at least one object of security concern contains at least one reference to another document, then information about the document that is referenced.

8. The system according to claim 2, wherein the server centrally manages information relating to the centralized list based on location information indicative of the location to which the at least one user document is provided.

9. The system according to claim 1, wherein the at least one processor in the server is further operable to provide a screening document containing information about the at least one object of security concern such that at least one user of the at least one document consumer is able to use that information to assess security risk associated with the object of security concern, and at least one option for the at least one user to provide preference information to the server indicative of whether to provide the object of security concern to the at least one document consumer.

10. The system according to claim 9, wherein the at least one processor is further operable to:
    a) associate the preference information provided by the at least one user to the server indicative of whether to provide the at least one object of security concern with the security setting of the at least one user profile receiving the document; and
    b) store the preference information in the at least one data storage device.

11. The system according to claim 10, wherein the first security setting comprises at least one centralized list, and the at least one processor is further operable to:
    a) modify the at least one centralized list for the at least one user based on the preference information provided by the at least one user in response to the screening document; and
    b) associate the modified centralized list with the security setting of the at least one user profile receiving the document.

12. The system according to claim 9, wherein the information contained in the screening document comprises a non-executable rendering of the object of security concern.

13. The system according to claim 12, wherein the non-executable rendering of the object of security concern comprises at least one of:
    a) an image representation of the object of security concern;
    b) if the object of security concern comprises instructions executable by the at least one document consumer, then text of the instructions; and
    c) information about the user profile that is associated with the at least one user document containing the at least one object of security concern.

14. The system according to claim 13, wherein the at least one processor is further operable to:
   a) associate the scope of applicability provided by the at least one user with the user profile receiving the document; and
   b) store the scope of applicability in the at least one data storage device.

15. The system according to claim 9, wherein the screening document further comprises at least one other option for the at least one user to indicate a scope of applicability of the information provided to the server, the scope of applicability being indicative of when the server should apply the information provided by the at least one user to determine whether to provide the object of security concern.

16. The system according to claim 15, wherein the scope of applicability includes at least one of:
   a) applicability for a current session;
   b) applicability for the at least one document consumer from that point on;
   c) applicability for a particular external domain referenced in the at least one user document;
   d) applicability for a particular document provider; and
   e) applicability for a particular type of object of security concern.

17. The system according to claim 9, wherein the server centrally manages information relating to the centralized list based on extrinsic information provided by one or more users in response to one or more screening documents.

18. The system according to claim 1, wherein the at least one object of security concern comprises at least one of:
   a) instructions executable by the at least one document consumer in JavaScript language;
   b) instructions executable by the at least one document consumer to obtain information from an external domain.

19. A server for securing documents comprising:
   a) at least data storage device for storing a plurality of user documents, at least one of the user documents containing at least one object of security concern being associated with a user profile;
   b) at least one network device for connecting to at least one document provider and at least one document consumer, the at least one document provider operable to provide at least one of the user documents to the server, the at least one document consumer operable to receive at least one of the plurality of user documents from the server;
   c) at least one processor coupled to the at least one data storage device and the at least one network device, the at least one processor in the server is operable to:
      i) determine whether to provide the at least one object of security concern in the at least one of the user documents concern to the at least one document consumer based on a first security setting associated with a user profile of a user receiving the document and a second security setting associated with the user profile of the user providing the document;
      ii) if it is determined that the at least one object of security concern should be provided, then provide the at least one user document with the at least one object of security concern to the at least one document consumer, and
      iii) if it is determined that the at least one object of security concern should not be provided, then generate at least one replacement document containing the at least one user document without the at least one object of security concern and an indication that the at least one object of security concern has been excluded, and provide the at least one replacement document to the at least one document consumer;
   d) wherein each user profile includes profile information about the user associated with that profile including information that is indicative of a level of access granted to each user.

20. A method for securing documents at a server having at least one server processor and at least one data storage device comprising:
   a) receiving at least one document from at least one document provider containing at least one object of security concern;
   b) storing the at least one document in at least one data storage device;
   c) using the at least one server processor to determine whether to provide the at least one object of security concern to at least one document consumer based on a first security setting associated with a user profile of a user receiving the document and a second security setting associated with a user profile of a user providing the at least one document;
   d) if it is determined that the at least one object of security concern should be provided, then using the at least one server processor to provide the at least one document with the at least one object of security concern to the at least one document consumer; and
   e) if it is determined that the at least one object of security concern should not be provided, then using the at least one server processor to generate at least one replacement document containing the at least one document without the at least one object of security concern and further containing an indication that the at least one object of security concern has been excluded, and providing the at least one replacement document to the at least one document consumer;
   f) wherein each user profile includes profile information about the user associated with that profile including information that is indicative of a level of access granted to each user.

21. The method according to claim 20, wherein the first security setting includes at least one centralized list managed by the server, the at least one centralized list comprising a black list indicative of a list of objects of security concern that should not be provided to the at least one document consumer.

22. The method according to claim 20, wherein the first security setting includes at least one centralized list managed by the server, the at least one centralized list comprising a white list indicative of a list of objects of security concern that should be provided to the at least one document consumer.

23. A non-transitory computer readable medium comprising instructions executable by a processor to cause the processor to:
   a) receive at least one document containing at least one object of security concern from at least one document provider;
   b) store the at least one document in at least one storage device;
   c) determine whether to provide the at least one object of security concern to at least one document consumer based on a first security setting associated with a user profile of a user receiving the document and a second security setting associated with a user profile of a user providing the at least one document;

d) if it is determined that the at least one object of security concern should be provided, then provide the at least one document with the at least one object of security concern to the at least one document consumer; and e) if it is determined that the at least one object of security concern should not be provided, then generate at least one replacement document containing the at least one document without the at least one object of security concern and an indication that the at least one object of security concern has been excluded, and provide the replacement document to the at least one document consumer;

f) wherein each user profile includes profile information about the user associated with that profile including information that is indicative of a level of access granted to each user.

24. A system for securing documents comprising:

a) a server having at least one processor and at least one data storage device for storing documents;

b) at least one document provider connected to the server, the at least one document provider operable to provide at least one user document to the server for storage in the at least one data storage device, the at least one user document containing at least one object of security concern and being associated with a user profile of a user providing the document; and c) at least one document consumer connected to the server, the at least one document consumer operable to receive the at least one user document containing the at least one object of security concern from the server;

d) wherein the at least one processor in the server is operable to:

i) determine whether to provide the at least one object of security concern to the at least one document consumer based on a first security setting associated with a user profile of a user receiving the document and a second security setting associated with the user profile of the user providing the document;

ii) if and only if it has previously been determined that the at least one object of security concern should be provided, provide the at least one user document with the at least one object of security concern to the at least one document consumer, and iii) if and only if it has previously been determined that the at least one object of security concern should not be provided, then:

(1) generate at least one security concern indicator for indicating that the at least one object of security concern has been excluded from the at least one user document; and, (2) provide the at least one user document to the at least one document consumer, wherein the at least one object of security concern has been replaced with the at least one security concern indicator;

wherein each user profile includes profile information about the user associated with that profile including information that is indicative of a level of access granted to each user.

\* \* \* \* \*